United States Patent [19]

Carlin

[11] 4,257,349

[45] Mar. 24, 1981

[54] ANABOLIC RECOVERY HEATING UNIT FOR SMALL ANIMALS

[76] Inventor: Milton O. Carlin, 13111 E. 11th St., Tulsa, Okla. 74108

[21] Appl. No.: 4,472

[22] Filed: Jan. 18, 1979

[51] Int. Cl.³ .............................................. A01K 67/00
[52] U.S. Cl. ........................................ 119/1; 119/103; 128/403; 219/217; 219/521; 219/527
[58] Field of Search ............... 219/211, 212, 217, 345, 219/404, 386, 387, 521, 524, 527, 525, 528, 430, 432, 433, 434; 119/1, 16, 33, 103; 128/254, 256, 403

[56] References Cited

U.S. PATENT DOCUMENTS

| 1,754,763 | 4/1930 | Nunnally | 219/527 X |
| 2,088,160 | 7/1937 | Carlson | 119/33 X |
| 2,109,163 | 2/1938 | Carlson | 119/33 |
| 2,280,779 | 4/1942 | Barragy | 119/33 |
| 3,125,663 | 3/1964 | Hoffman | 219/217 |
| 3,245,337 | 4/1966 | White et al. | 219/524 X |
| 3,995,592 | 12/1976 | Goldstaub et al. | 119/33 X |
| 4,163,896 | 8/1979 | McAvinn et al. | 219/525 |

FOREIGN PATENT DOCUMENTS

| 87157 | 11/1920 | Switzerland | 219/217 |
| 103844 | 3/1923 | Switzerland | 219/217 |

*Primary Examiner*—Volodymyr Y. Mayewsky
*Attorney, Agent, or Firm*—Head & Johnson

[57] ABSTRACT

An anabolic recovery unit for small animals having a rectangular frame with side walls, end walls and a top surface, the bottom edges of the walls being in a common plane forming a base on which the frame rests, a rectangular shelf supported within the frame below the top and having means of varying the spacing between the shelf and the lower surface of the frame top, and a electric heating element supported on the frame whereby the top of the frame is maintained at a selectable temperature beneficial to small animals lying on the frame top.

1 Claim, 4 Drawing Figures

ANABOLIC RECOVERY HEATING UNIT FOR SMALL ANIMALS

After surgery is performed by a veterinarian on a small animal, such as a dog, cat or the like, the animal is placed in a confined area or pen for recovery. A problem encountered by veterinarians is that of the occurrence of hypothermia. Animals at 90° F. or lower and under an anesthetic cannot actively warm themselves. Hypothermia reduces the metabolic rate and with the inability to warm themselves can cause rapid deterioration of the animal's condition. Hypothermia lowers oxygen uptake. During the early stages of hypothermia, hypoxia and alkalosis occur with acidosis occuring at 90° to 91° F. When this results the heart rate drops and arrhymia may be followed by fibrilation. At 85° F. death may occur. Since the veterinarian cannot maintain room temperature conditions at these levels and work in comfort, it is known expediency to provide cage warmers for small animals for use during recovery. Others have provided heating pads on which animals may be placed. A difficulty with heating pads is that of accurately regulating the temperature and the tendency of heating pads to develop hot spots. Hence an animal lying directly on a heating pad in an anesthetized condition is easily burned if the heat is too high. Others have provided relatively complicated devices wherein heating elements are formed within closed structures with thermostatic controls. The problem with these devices is that they are not only expensive initially but when the heating element becomes defective the entire device must be discarded or at least, is difficult to repair. Still others have provided animal warmers or cage warmers utilizing heated liquid, some with devices for circulating the liquid surrounding a container in which the animal is placed. These devices are not only very expensive and difficult to maintain but they too require an accurate thermostat to maintain the necessary proper temperature.

The present invention is directed to a device for use in a cage in which a small animal is placed for recovery which overcomes most of the problems associated with present devices. The present invention provides an anabolic recovery unit utilitzing an inexpensive readily available heating unit in the form of a heating pad in an arrangement wherein if the heating pad becomes inoperative it can be expeditiously discarded and replaced. Thus the invention provides an anabolic recovery unit which is much more economical than existing type electric devices and in addition, much less expensive and trouble free compared to existing type devices utilizing heated liquid.

Another problem connected with anabolic recovery units available at the present time is that of keeping the animal dry and clean during the recovery period. Animals frequently excrete liquids following an operation, such as blood, vomit, urine and so forth. Unless some means is provided for automatically removing these liquid excrements the animal can become wet and dirty and this aggravates the possibility of hypothermia and, in addition, increases the difficulty of properly caring for the animal. The present invention provides a device wherein excreted liquids are drained away from the animal and collected so as to maintain the animal in a cleaner and more sanitary environment during recovery.

These general objects as well as other and more particular objects of the invention will be fulfilled in the following description and claims, taken in conjunction with the attached drawings.

DESCRIPTION OF THE VIEWS

DETAILED DESCRIPTION

Figure 1:
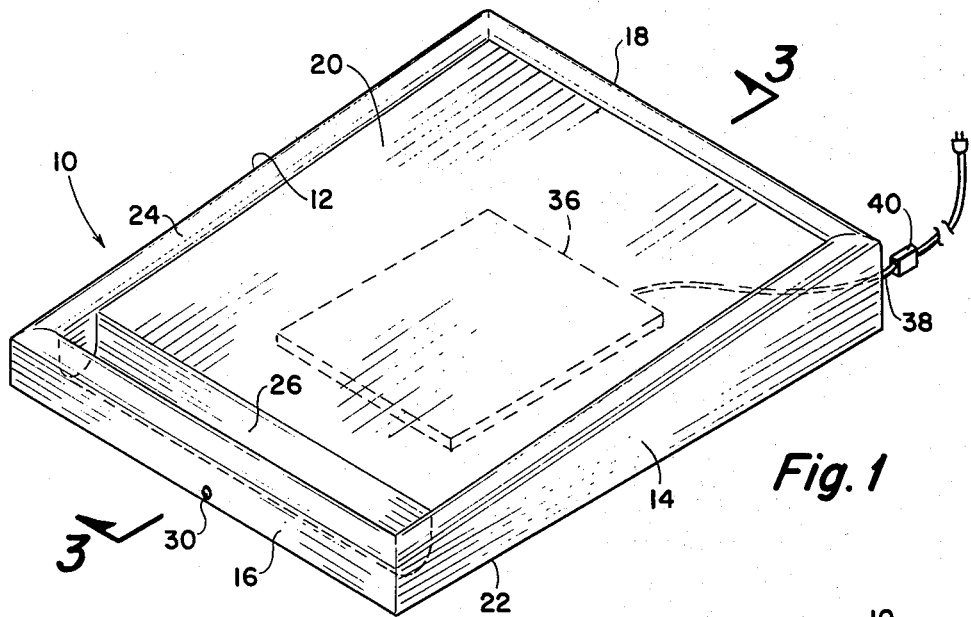
FIG. 1 is an isometric view of an anabolic recovery unit of this invention.

Referring to the drawings first in FIG. 1, the recovery unit is generally indicated by the numeral 10. The unit is in the form of a rectangular frame having downwardly depending side walls 12 and 14, and end walls 16 and 18. The frame has a planar top 20. The lower edges of side walls 12 and 14 and end walls 16 and 18 are in a common plane and form a base or bottom 22 on which the frame is supported. The frame structure is hollow so that the top 20 is spaced above base 22.

In a preferred embodiment, and as illustrated, end wall 16 is shorter than end wall 18 so that top 20 is inclined. The frame is formed to provide a ridge 24 around the full perimeter and a recess 26 is formed in the top 20 adjacent the short end wall 16.

The frame is integrally formed of all of the elements thus far numerated and is preferably of an impervious material such as metal, plastic or fiberglas. Fiberglas or plastic is preferred since these materials make the frame light, easily cleaned, inexpensive to manufacture and sufficiently strong for the intended purpose.

Figure 2:
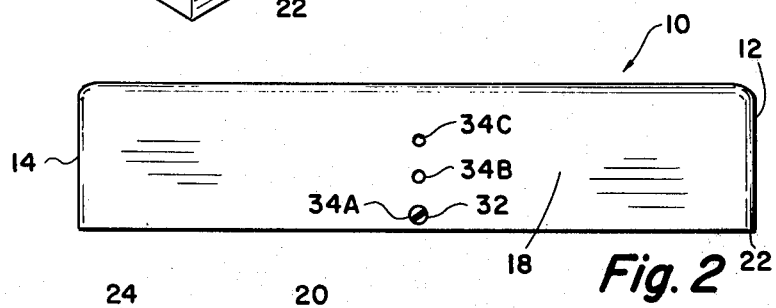
FIG. 2 is an elevational view of the end opposite that seen in FIG. 1.
Figure 4:
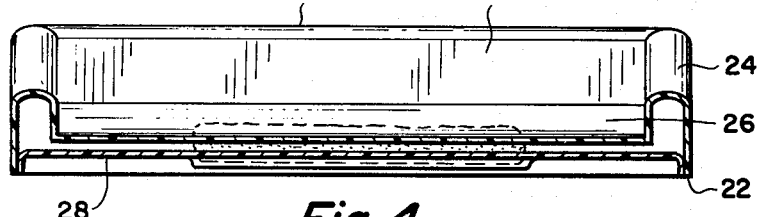
FIG. 4 is a cross-sectional view taken along the line 4—4 of FIG. 3.
Figure 3:
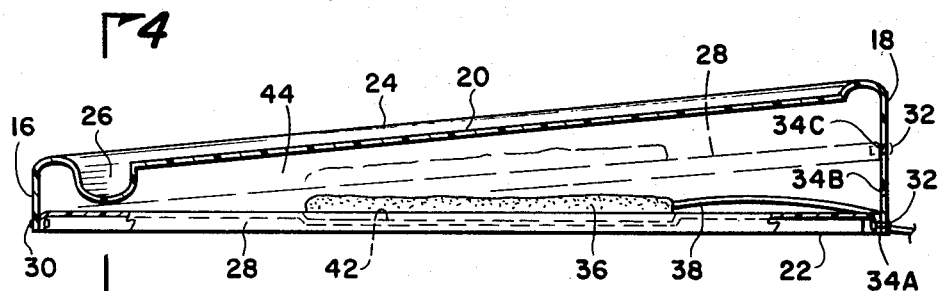
FIG. 3 is a cross-sectional view taken along the line 3—3 of FIG. 1.

Positioned within the frame, below top 20 and confined by side walls 12 and 14 and end walls 16 and 18, is a rectangular shelf 28. The length of the shelf 28 is slightly less than the internal dimensions between end walls 16 and 18 and also the width is less than the inside spacing between side walls 12 and 14. The shelf is affixed to the short end wall 16 such as by means of a bolt or screw 30 and the other end is supported to the opposite end wall 18 in a manner such that the elevational position may be varied. In the illustrated arrangement the shelf 28 is supported to end wall 18 by means of a bolt 32 which may extend through a plurality of openings 34A, 34B and 34C in end wall 18, as illustrated in FIGS. 2 and 3.

Positioned on shelf 28 is an electric heating element 36 which is preferably in the form of a heating pad of a standard type which may be purchased in a drug store or general merchandise store. The heating pad has an electrical conductor 38 extending from it and typically a combination switch and heat control 40. Shelf 28 has a recess 42 to retain the heating pad 36. To further insure the proper positioning of the heating pad below the center of top 20 tie down means (not shown) may be employed to attach the heating pad to the shelf 28.

The frame is dimensioned to be positioned in a cage and to receive a small animal, such as a dog or cat thereon. While dimensions may vary, a frame usable in standard size cages may be about 60 centimeters wide by 75 centimeters long, with the short end wall 16 measured to the top ridge 24 about 8 millimeters and end wall 18 measured to the top of the ridge about 12 centimeters. Obviously, the specific dimensions are not critical and the dimensions recited here are merely to give an example of one embodiment of the invention.

The anabolic recovery unit for small animals is used by a veterinarian in the following manner. The unit is placed with the base 22 resting on the bottom of the cage. Heating element 36 is energized and the heat thereof warms the frame top 20. When an operation has been completed on an animal, it is placed on the top 20 and the animal's temperature is corrected and the animal is prevented from hypothermia by the increased heat available to it. Any liquids discharged from the animal are drained by inclined top 20 and collect in recess 26 so that the animal stays dry and clean compared to placing the animal on a flat surface, or on a standard heating pad.

As previously indicated, one of the difficulties in the use of a heating element to cmbat hypothermia is the difficulty of accurately regulating the temperature of the heating element. Temperature regulation of heating pads is not always accurately controllable and if the temperature becomes excessive, or hot spots develop, an animal placed directly on a heating pad may be burned. The present invention obviates this problem by providing air space 44 between the heating element and the top 20 so that excessive heat is more widely dissipated and the effects of hot spots are eliminated.

The amount of heat imparted the top 20 by heating element 36 may be varied by changing the spacing between the heating element and the top 20. This is accomplished by changing the elevation of shelf 28. With a given heating pad the veterinarian will soon discover the best arrangement of the shelf 28 for the most appropriate temperature of the frame top 20.

When a quantity of liquid has been collected in recess trough 26, the frame 10 may be easily removed from the cage in which it is positioned so that the trough can be emptied. The frame may be washed quickly and easily to keep it sanitary.

When heating element 36, especially when in the form of a readily available heating pad, becomes deffective, it can easily be discarded and replaced by a new heating pad without the necessity of other repairs. Since the heating element 36 is easily retained within the frame it does not require an electrical technician to replace it when it becomes deffective.

The invention described fulfills all of the objectives initially set forth. It provides an anabolic recovery unit for small animals which affords improved means of keeping an animal dry, clean and warm. At the same time, the device provides a facility utilizing a readily and inexpensively available heating means with improved economy and safety.

While the invention has been described with a certain degree of particularity, it is manifest that many changes may be made within the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled. What is claimed is:

1. An anabolic recovery unit for small animals comprising:

rectangular frame of impervious material having a planar top surface and integral, downwardly depending, spaced apart end walls and side walls, the lower edge of the end and side walls being in a common plane forming a base on which the frame rests, the top being planar and inclined downwardly from one end to the other, the frame having an integral raised lip around the periphery thereof, and having a fluid retaining recess adjacent the lower end; the frame top being dimensioned for receiving small animals thereon;

a rectangular shelf having dimensions less than the interior spacing between said frame end walls and side walls, the shelf being supported within the frame walls below said top;

an electrical heating pad having smaller dimensions than the shelf being supported on said shelf, there being an air space between the top lower surface and the heating pad; and means of elevationally positioning said shelf to vary the spacing of said heating pad from said frame top comprising one end of said shelf being pivotally affixed to the interior of the shortest of said frame end walls and the other end of said shelf being supported to the interior of the opposite frame end wall at selectable elevations.

* * * * *